(12) United States Patent
Weitenberner (10) Patent No.: US 9,858,036 B2
(45) Date of Patent: Jan. 2, 2018

(54) AUTOMATIC AUDIO LEVEL ADJUSTMENT DURING MEDIA ITEM PRESENTATION

(71) Applicant: Google Inc., Mountain View, CA (US)

(72) Inventor: Christian Weitenberner, Venice, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/937,752

(22) Filed: Nov. 10, 2015

(65) Prior Publication Data

US 2017/0131966 A1 May 11, 2017

(51) Int. Cl.
| | |
|---|---|
| *H04N 9/80* | (2006.01) |
| *G06F 3/16* | (2006.01) |
| *G10L 25/57* | (2013.01) |
| *G11B 27/28* | (2006.01) |
| *G11B 27/34* | (2006.01) |

(52) U.S. Cl.
CPC ............. *G06F 3/165* (2013.01); *G10L 25/57* (2013.01); *G11B 27/28* (2013.01); *G11B 27/34* (2013.01)

(58) Field of Classification Search
CPC ............................... G10L 25/57; G11B 27/28
USPC .................... 386/240, 304, 241, 270, 285
See application file for complete search history.

(56) References Cited

U.S. PATENT DOCUMENTS

| | | | | |
|---|---|---|---|---|
| 7,158,624 B1 * | 1/2007 | O'Toole, Jr. | ........ | H04M 3/4285 379/201.1 |
| 7,702,014 B1 * | 4/2010 | Kellock | ........... | G11B 27/034 375/240.01 |
| 7,720,238 B2 * | 5/2010 | Tomita | ..................... | H03G 3/30 348/473 |
| 2007/0256014 A1 * | 11/2007 | Du Breuil | ............... | H04N 5/60 715/716 |
| 2009/0304205 A1 * | 12/2009 | Hardacker | ............. | H03G 3/301 381/104 |
| 2011/0019839 A1 | 1/2011 | Nandury | | |
| 2014/0173437 A1 * | 6/2014 | Pugh | ................... | G11B 27/034 715/723 |

FOREIGN PATENT DOCUMENTS

CN 102567468 A 7/2012

OTHER PUBLICATIONS

Extended European Search Report for European Patent Application No. EP 16197998.4, dated Mar. 23, 2017, 6 Pages.

\* cited by examiner

*Primary Examiner* — Helen Shibru
(74) *Attorney, Agent, or Firm* — Lowenstein Sandler LLP (57) ABSTRACT

A media server facilitates automatic audio level adjustment during playback of a media item by a media player application running on a computing device. A media server provides media items to clients via a network. A media player application on a client presents media items to a user of the client. The media player application may also collect playback data and send the data to the media server. Playback data may include audio levels for two media items presented sequentially. The media server determines audio level adjustment instructions based on playback data received from one or more media player applications and provides the instructions to cause automatic audio level adjustments to facilitate the presentation of media items at more appropriate sound strengths.

14 Claims, 6 Drawing Sheets

Example Audio Level Index 300

| First Media Item ID | Second Media Item ID | Primary AL | Secondary AL | Secondary AL - Primary AL |
|---|---|---|---|---|
| Cat.mov | Pig.mov | 35 | 68 | +33 |
| Cat.mov | Pig.mov | 22 | 45 | +23 |
| Cat.mov | Pig.mov | 67 | 67 | 0 |
| Cat.mov | Pig.mov | 44 | 40 | -4 |
| Cat.mov | Dog.mov | 32 | 55 | +23 |
| Dog.mov | Pig.mov | 35 | 79 | +44 |
| Dog.mov | Cat.mov | 12 | 33 | +21 |

Example Audio Level Index 300

| First Media Item ID | Second Media Item ID | Primary AL | Secondary AL | Secondary AL - Primary AL |
|---|---|---|---|---|
| Cat.mov | Pig.mov | 35 | 68 | +33 |
| Cat.mov | Pig.mov | 22 | 45 | +23 |
| Cat.mov | Pig.mov | 67 | 67 | 0 |
| Cat.mov | Pig.mov | 44 | 40 | -4 |
| Cat.mov | Dog.mov | 32 | 55 | +23 |
| Dog.mov | Pig.mov | 35 | 79 | +44 |
| Dog.mov | Cat.mov | 12 | 33 | +21 |

Keys 310 { First Media Item ID, Second Media Item ID } → 312, 314

Values 320 { Primary AL → 322, Secondary AL → 324, Secondary AL - Primary AL → 326 }

AUTOMATIC AUDIO LEVEL ADJUSTMENT DURING MEDIA ITEM PRESENTATION

BACKGROUND

The disclosure generally relates to presentation of media content on a computing device, and more specifically to automatic audio level adjustment during presentation.

Video streaming websites and other media servers allow users access to millions of items of media content (media items). High user engagement is an important goal of content creators, advertisers, and other affiliates of a media server. Thus, it is desired for users to watch multiple videos in one sitting. When user watch multiple videos, ensuring a good user experience is critical, and depends in part on good transitions between media items.

However, when watching media items back-to-back, the loudness of the audio perceived by a user can often vary dramatically between media items. The experience of moving from one media item to the next can be jarring, especially when the subsequent media item's audio component is significantly louder or quieter than the previous one. Many creators who upload media items to media servers do not normalize sound strength before uploading, or otherwise process audio according to any known industry standard. Further, creators of audio cannot always be sure of the order in which media items will be played back to a user, and thus although their own uploads may be consistent in terms of loudness, they will not necessarily match those of other users. Consequently, when a user plays multiple media items back-to-back, that user may have to constantly adjust the audio level to keep the loudness at a reasonable level. This results in a sub-par user experience and can cause users to abandon watch sessions.

The Figures (FIGS.) and the following description relate to example embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

I. Configuration Overview

A media server facilitates automatic audio level adjustment during playback of a media item by a media player application running on a computing device. The media server provides media items, such as videos, to client computing devices, such as desktop computers or mobile phones, via a network. A media player application on the client presents the media items to the user. The media player application may also collect playback data, such as adjustments of the audio level (or amplitude) of the player application, and send the data back to the media server. Such adjustments are also used to change the sound strength of the audio that comes out of an audio output device of the client, such as headphones or a loudspeaker.

The adjustable audio level controlled by the user is not the actual sound strength as experienced by the user listening to the audio component, however it does relate to and control that value. When audio output data is converted to sound by the audio output device, it has a sound strength which corresponds to a loudness of the audio component of the media item, for example, in decibels. When audio output data is presented at an audio level, objective measures of sound strength (e.g., sound pressure level, sound intensity, sound power, etc.) may vary based on the audio output device, intrinsic characteristics of the audio component of the media item, and other factors. As the actual sound strength will vary between media items (e.g., those professionally recorded vs. those recorded via home video camera), audio level is not entirely determinative of the sound strength experienced by the user. Because sound strength may vary based on characteristics of the audio component of the media item, if two media items are played in sequence at the same audio level through the same audio output device, the sound strength of the media items, and by extension, the loudness perceived by a user, may differ.

An audio module within the client adjusts the audio level responsive to receiving audio control commands. Audio control commands include commands to increase the audio level, decrease the audio level, or set the audio level to a particular value, and may be initiated automatically (e.g., by software code) or via a user input. To enhance the user experience of the media player application, the audio level may be automatically adjusted when a second media item is presented after a first media item to mitigate the difference sound strengths between the two media items which would otherwise result in a difference in loudness to the user absent such a modification to the audio level. The automatic adjustment may be based on an ALA value, which may be determined from user information, media item metadata, or data regarding user-initiated ALAs for the media item pair consisting of the first and second media items.

To collect data regarding user-initiated ALAs for the media item pair, the media server may provide the first media item and the second media item for sequential presentation by the media player application to one or more different users. During presentation of the first media item, the user may change the audio level to correspond to an appropriate sound strength for the presentation of the first media item. When presentation of the first media item ends, the audio level may be set to a primary audio level. When presentation of the second media item begins, the primary audio level may not correspond to an appropriate sound strength for the presentation of the second media item. Thus, the user may send an audio command to change the audio level to a secondary audio level to correspond to an appropriate sound strength. The media player application may register and store the audio command and may send a data entry to the media server comprising media item identifiers of the first and second media items, and the primary and secondary audio levels. The data entry may further comprise audio output device information and audio control command information. The media server may store the data entry elements in an audio level index.

To facilitate an automatic ALA, the media server may generate ALA instructions (e.g., computer software code) based on audio level index entries. ALA instructions may cause the audio level to change automatically when the second media item is played after the first media item. The automatic change of the audio level enhances the user experience by automatically setting the audio level to correspond to a more appropriate sound strength for the second media item. Subsequent changes to the audio level may be registered and stored by the media player application and sent to the media server to determine updated ALA values.

II. Computing Environment

Figure 1:
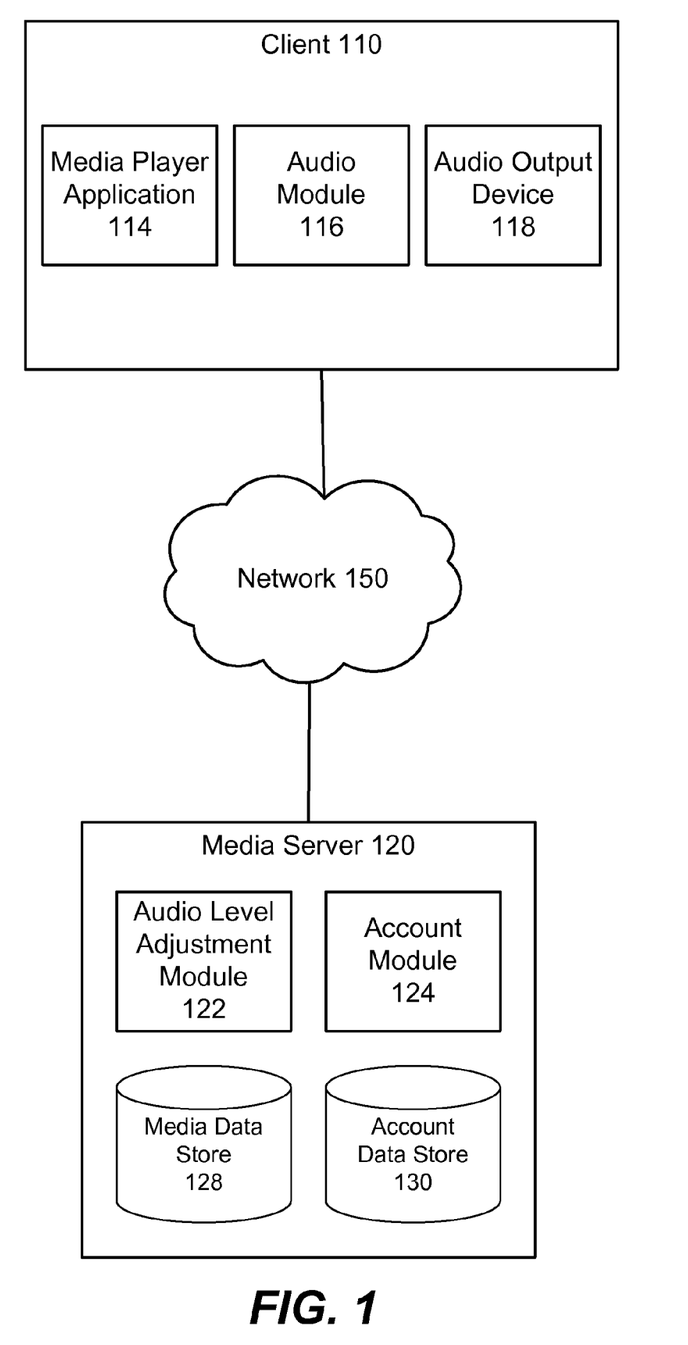
FIG. 1 illustrates a computing environment for automatic audio level adjustment (ALA) in a media player application.

FIG. 1 illustrates a computing environment for automatic audio level adjustment in a media player application. The environment includes a client 110 connected by a network 150 to a media server 120. FIG. 1 illustrates one client 110 and one media server 120, but there may be multiple instances of each of these entities. For example, there may be thousands or millions of clients 110 in communication with multiple media servers 120.

The network 150 may comprise any combination of local area and/or wide area networks, the internet, or one or more intranets, using both wired and wireless communication systems.

The media server 120 includes one or more computer servers that provide media items to the client 110. In some embodiments, the media server 120 may be a video streaming website (e.g., YouTube®). Media items may be of different types (e.g., video media items or audio media items, etc.), formats (4:3 aspect ratio, 16:9 aspect ratio, etc.), and be encoded/compressed using different techniques (H.264, MPEG, etc.). A video media item includes a picture component and an audio component. A video media item may be a video data file and/or a portion thereof. An audio media item includes an audio component, but does not include a picture component. An audio media item may be an audio data file and/or a portion thereof.

Clients 110 are computing devices that execute computer program modules—e.g., a web browser, e-book reader, media player, or other client application—which allow a user to consume audio and/or video data. A client 110 might be, for example, a personal computer, a tablet computer, a smart phone, a laptop computer, a dedicated e-reader including at least audio playback functionality, or other type of network-capable device such as a networked television or set-top box.

A user of the client 110 may have an account with the media server 120. An account module 126 provides functionality allowing a user to manage his or her account with the media server 120. The account module 124 further receives user information corresponding to a user's activities related to the media server 120. User information may comprise identifiers of media items provided to a client 110 associated with the user, user preferences, and playback data associated with the user, including the order of playback of media items. User information and other account information may be stored in an account data store 130 of the media server 120. Depending upon the embodiment, the account data store 130 may include one or more types of non-transitory computer-readable persistent storage media.

The client 110 may include a media player application 114. The media player application 114 may be a software application executed by a processor of the client 110 for presenting media items to a user operating the client 110. For example, a video media item may be presented to the user by presenting the picture component via a display of the client 110 and presenting the audio component, through the audio module 116 as described below, and as audible audio signals via an audio output device 118 of the client 110.

The media player application 114 may execute in conjunction with an operating system of the client 110. In one embodiment, the media player application 114 is a dedicated software application designed to work specifically with the media server 120. In another embodiment, the media player application 114 is provided via a more general application for accessing many types of content, such as a web browser. The browser may provide access to the media server 120, for example, via a web interface. In some embodiments, the media player application 114 presents the media item as it is being streamed over the network 150 from, for example, the media server 120.

The media player application 114 may present a user interface, for example, on a display device of client 110. The user interface may include control elements with which the user of the client 110 may send control commands via a user input device (e.g., mouse, keyboard, touchscreen, trackpad, buttons, etc.). Control commands may also be received by the client 110 or the operating system of the client 110 via physical buttons on the client 110 or a device communicatively coupled to the client 110. Control commands may be received via executed software code (e.g., API call). Control commands may further be sent to the client 110 by media server 120 in the form of playback instructions, including audio level adjustment (ALA) instructions, as discussed below with respect to FIG. 4 in Section IV.

The media player application 114 and/or the client 110 may be configured to receive control commands. Control commands may include commands for controlling playback of a media item being presented by the media player application 114, including stopping playback of a media item, beginning playback of a media item, and requesting a media item from media server 120. Control commands may further include audio control commands such as increasing the audio level, decreasing the audio level, setting the audio level to a particular value, or muting the audio component.

The audio module 116 may receive input audio data representing the audio component of a media item from the media player application 114, change the amplitude of the audio component, and send audio output data representing the adjusted audio component to the audio output device 118. Audio output data may be converted to sound by the audio output device 118.

The audio module 116 may have an associated audio level, which corresponds to a relationship (e.g., ratio, percentage, linear or non-linear function, etc.) that sets the amplitude of the audio output signal to the amplitude of the audio data, regardless of how that audio data was originally recorded or encoded. In one implementation, the audio level value does not correspond to any specific numerical value (e.g., in decibels) for the actual sound strength as would be perceived by a user. The audio module 116 may adjust the audio level responsive to receiving audio control commands, either automatically (e.g., by software code) or via a user input. When audio output data is converted to sound by an audio output device 118, it has a sound strength which corresponds to a loudness of the audio component of the media item. There are various objective measures for sound strength, including for example, sound pressure (in Pascals), sound pressure level (in decibels), sound intensity (in watts per square meter), and sound power (in watts). The audio level may have an associated audio level value (e.g., within a range from 0-10, 1-100, etc.).

When audio output data is presented at an audio level, objective measures of sound strength (e.g., sound pressure level, sound intensity, sound power, etc.) may vary based on the audio output device 118, intrinsic characteristics of the audio component of the media item, and other factors. Because sound strength may vary based on characteristics of the audio component of the media item, if two media items are played in sequence at the same audio level value through the same audio output device 118, the sound strength of the media items, and by extension, the loudness perceived by a user, may differ.

To enhance the user experience of the media player application 114, the audio level may be automatically adjusted according to ALA instructions when a second media item is presented after a first media item to mitigate the difference in loudness perceived by the user due to differences in between the underlying audio data of the two media items. ALA instructions may be determined from user information, media item metadata, or data regarding user-initiated ALAs for the media item pair. Collecting data regarding user-initiated ALAs is discussed in more detail below with respect to FIG. 2 in Section III, below.

The audio module 116 may be a component of the media player application 114, the operating system, the client 110, a separate software application, or some combination thereof. Audio output devices include devices for producing sound that are communicatively coupled to the client 110. The audio output device 118 may be a component of the client 110 (e.g. a loudspeaker). Other example audio output devices include headphones, external speakers, gramophones, etc. The audio output device 118 may be communicatively coupled to the client 110 via a wired or wireless connection.

The audio module 116 may be configured to determine a type of the audio output device 118 (e.g., internal speaker, external speaker, headphones, etc.). The format of audio output data may differ depending on the audio output device 118. In one embodiment, the output audio data is an audio signal that represents sound using voltage. The audio signal may be converted to sound by the audio output device 118 such as a loudspeaker or headphones. In another embodiment, the output audio data is an audio signal in a digital format. When the audio output data is converted to sound by the audio output device 118, the sound has an associated sound strength. Sound strength may correspond to an amplitude of a sound wave, and is closely related to the level at which a person experiences sound. A relatively low sound strength may be perceived as quiet, while a relatively high sound strength may be perceived as loud.

The media server 120 maintains information relating to media items. Information relating to a media item may include a media item identifier (ID), a media item address, metadata associated with a media item, or some combination thereof. The media item ID uniquely identifies a media item. The media item address is a computer network address where the media item is physically stored and may be downloaded or streamed from. The metadata describes different aspects of the media item. The metadata may include, for example, author, date of publishing, reviews, genre information, publisher, ratings, and a media item identifier.

Information relating to media items may further include playback data including, for example, control commands received during playback of the media item such as commands received from a user to adjust the audio level of the audio module 116. Playback data may further include a set of audio level values corresponding to various time during playback of a media item when the audio level is to be adjusted. Playback data may be collected by media player application 114 and sent to media server 120 as described below with respect to FIG. 2 in Section III, below.

Information relating to media items may further include audio level adjustment (ALA) instructions to automatically adjust the audio level of the audio module 116 with a media item that are sent by media server 120 to the client 110 for playback. For example, ALA instructions may comprise software code that causes the audio level of audio module 116 to be adjusted when the media item is presented after a particular other media item. The audio level adjustment may occur automatically at the start of playback of the media item or at another time during playback. During playback, audio control commands initiated by a user may override or alter the ALA value, for example, by scaling the ALA value to correspond to a user-specified value. Automatic ALAs improve the consistency of audio playback between media items, which may increase average watch time, viewership, advertising revenue, subscription revenue, and engagement on the media server platform.

ALA instructions may be generated by an audio level adjustment module 122 of the media server 120. ALA instructions may be based on analysis of playback data, including a determined audio level difference values, as discussed in more detail below with respect to FIG. 4 in Section IV. ALA instructions may be generated responsive to a request from a client or at pre-determined intervals.

Media items, playback data, ALA instructions, and other information relating to media items may be stored in a media data store 128 of the media server 120. Depending upon the embodiment, the media data store 128 may include one or more types of non-transitory computer-readable persistent storage media.

III. Playback Data Collection and Indexing

Figure 2:
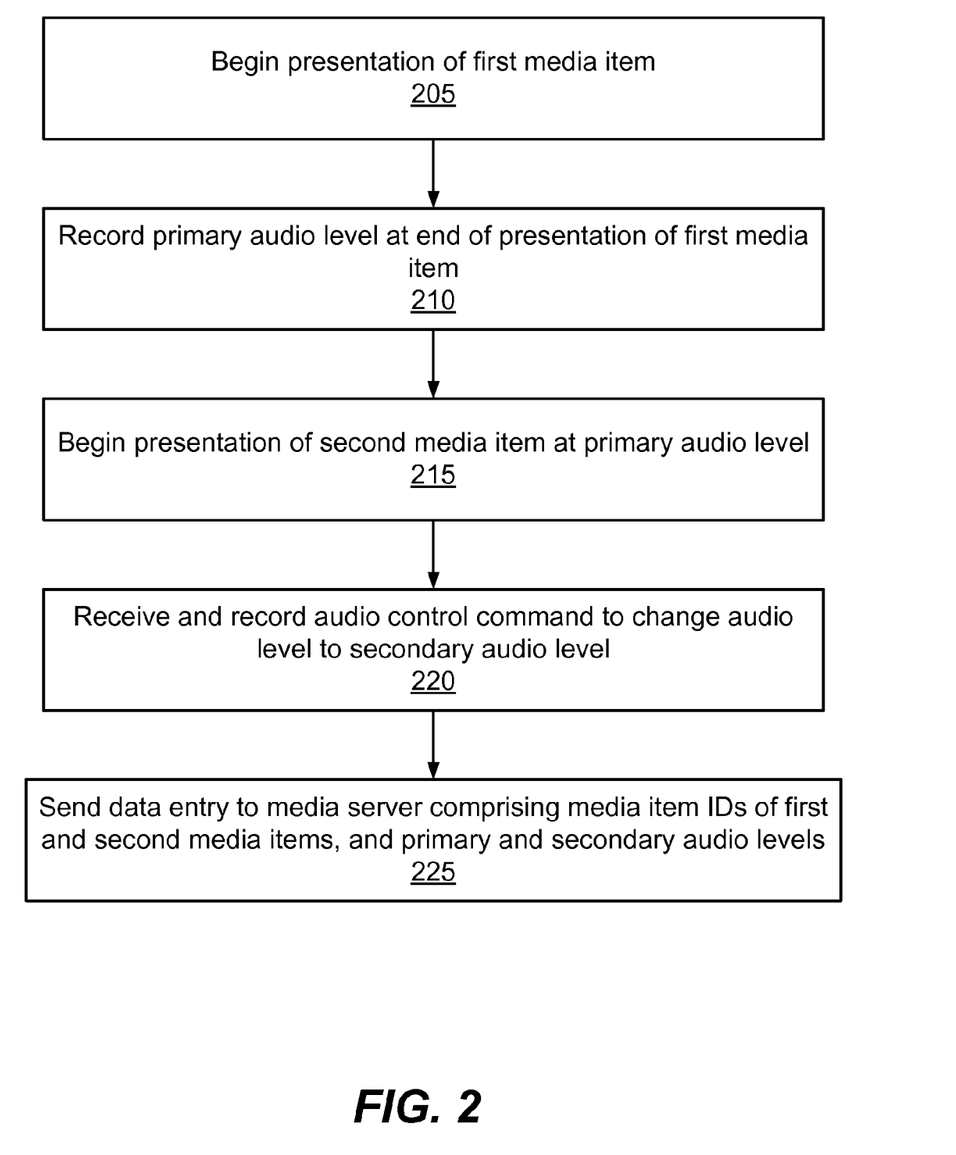
FIG. 2 is a flowchart of the steps for an example process for presenting two media items in sequence and collecting playback data that may be stored in an audio level index and used to determine ALA instructions.

For a particular pair of media items, ALA instructions may be based on audio level adjustments made by users who were previously presented the pair of media items in sequence. FIG. 2 is a flowchart of the steps for an example process for presenting two media items in sequence and collecting playback data that may be stored in an audio level index and used to determine ALA instructions. The media player application 114 of the client 110 begins 205 presentation of a first media item comprising a first audio component. During presentation, the user of the client 110 may decide to change the audio level and provide a control command to adjust the audio level to a more appropriate sound strength for presentation of the first media item. When presentation of the first media item ends, either at the end of the item or upon user or external command, the audio module 116 records 210 a primary audio level, either as initially set upon the beginning of presentation or as adjusted based on input from the user.

The media player application 114 then begins 215 presentation of a second media item, either responsive to a user input or automatically as determined and initiated by server 120. When presentation of the second media item begins, the audio module 116 may remain set to the primary audio level. The primary audio level may not correspond to an appropriate sound strength for presentation of the second media item to the user. For example, intrinsic characteristics of the audio component of the second media item may result in the sound strength during presentation of the second media item being greater or less than the sound strength during presentation of the first media item. For example, if the first media item contains a relatively loud heavy metal song and the second media item contains a relatively quiet piece of classical music, the user may not be able to hear the audio component of the second media item well. This difference may cause the user to send an audio command to change the audio level for the second media item to correspond to a more appropriate sound strength. The audio module 116 receives 220 the audio control command, and changes the audio level to the secondary audio level. The audio module 116 may register and store the audio control command at a storage location on the client 110 or the media server 120.

The media player application 114 sends 225 a data entry to the media server 120 including the media item ID of the first media item, the media item ID of the second media item, the primary audio level, and the second audio level. The data entry may further comprise a list of audio control commands received during presentation of the first and the second media items, including both their timestamps of occurrence during presentation of the associated media item as well as their change to the audio level. The data entry may also include information about the audio output device 118 such as an audio output device identifier (ID) and information about whether the audio output device had a wired or wireless connection.

The media server 120 receives the data entry from the media player application 114. The media server 120 may store data entry elements in one or more indices in media data store 128 and/or account data store 130 for use in generating ALA instructions. For example, the ALA module 122 may store data entry elements in an audio level index, which is independent of the user from which the data entry was received and may contain data entries from multiple users. If the user has an account with the media server 120, the data entry elements may be stored in an account index associated with the user in account data store 130.

Figure 3:
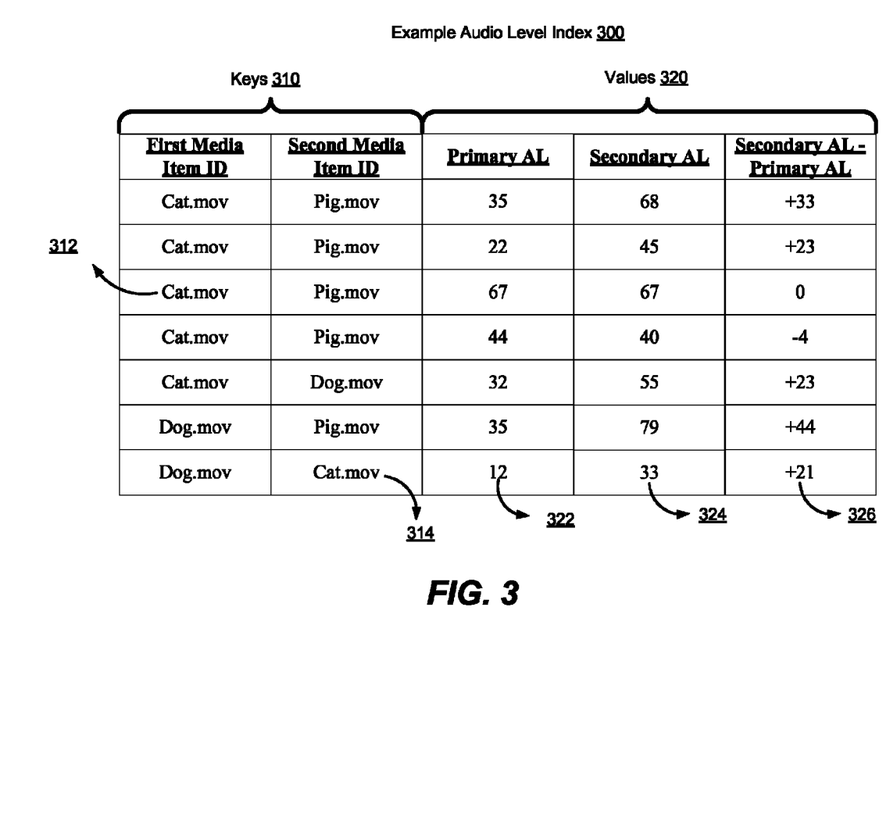
FIG. 3 illustrates example audio level index entries, which list media item IDs and primary and secondary audio levels for media items viewed in sequence.

FIG. 3 illustrates example audio level index entries, for example as collected by the process described with respect to FIG. 2. These example audio level index entries list media item IDs and primary and secondary audio levels for media items viewed in sequence. For example, as shown in FIG. 3, a key 310 of the audio level index 300 may be a pair of media item IDs created, for example, by combining a first media item ID entry 312 and a second media item ID entry 314. Values 320 of the audio level index may include a primary audio level entry 322 and a secondary audio level entry 324. Values 320 may further include a difference value 326 for each entry representing a difference between the audio levels. The difference value may be positive (e.g., representing a user command to increase the audio level), negative (e.g., representing a user command to decrease the audio level), or zero, and may be calculated by audio level adjustment module 122. Audio level index entries may be received from multiple users. Audio level index entries may further comprise audio output device information and the list of audio control commands.

IV. Audio Level Adjustment Determination

ALA instructions may cause an automatic ALA based on an ALA value, which may be determined from multiple sources of data, including (A) user information, (B) media item metadata, (C) audio level index entries for user-initiated ALAs for the media item pair, or some combination of these data sources. If multiple data sources exist, the determination of which sources to use to determine an ALA value may be hierarchical (e.g., data from source A is preferred, data from source B is used in the absence of data from source A, and data from source C is used in the absence of data from A or B), additive (e.g., data from source A, source B, and source C is used), or some combination thereof. The example process of FIG. 4 is an example of additive data use.

Figure 4:
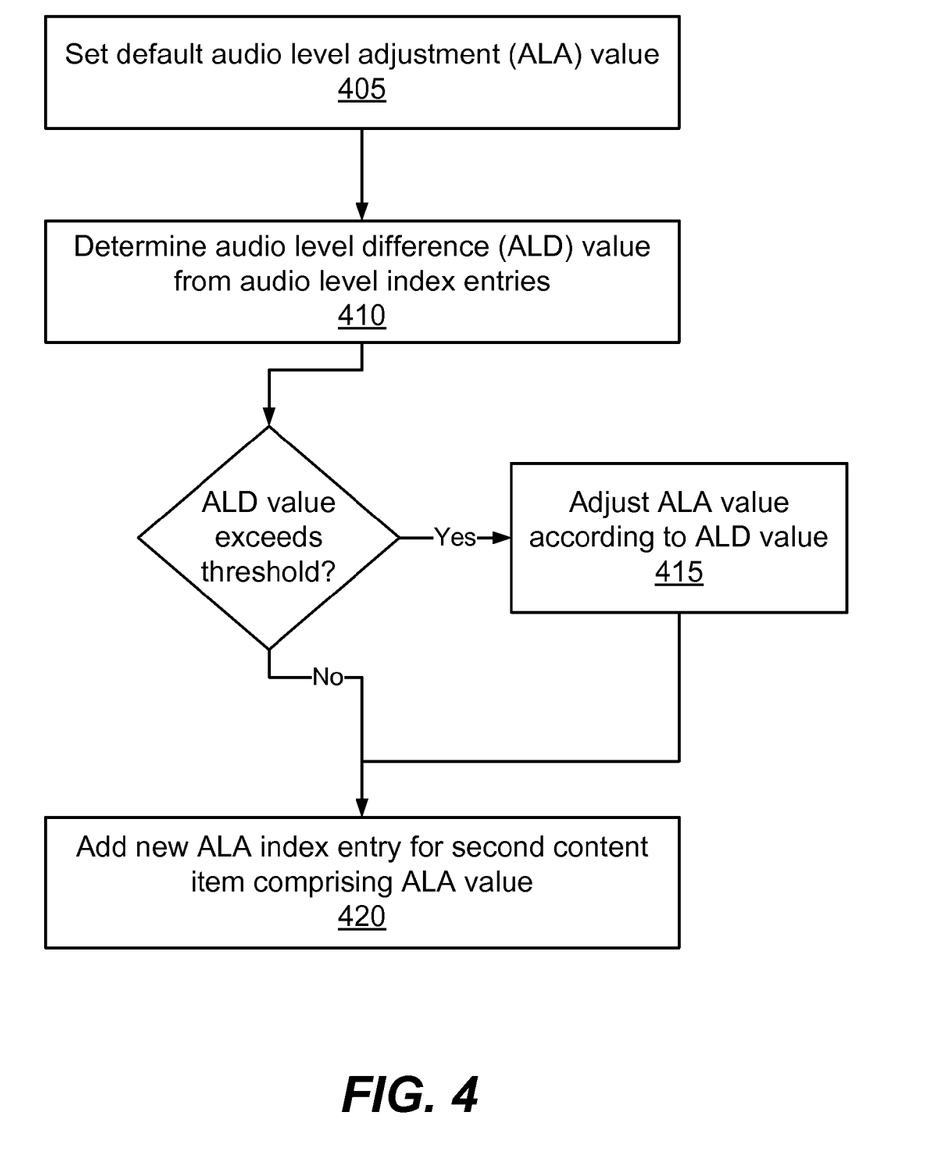
FIG. 4 is a flowchart of the steps for an example process for determining an ALA value to be included in ALA instructions associated with a first media item and a second media item presented in sequence.

FIG. 4 is a flowchart of the steps for an example process for determining an ALA value to be included in ALA instructions associated with a first media item and a second media item presented in sequence. The ALA module 122 sets 405 a default ALA value. The default ALA value may be based on the type of media item, genre information, or other metadata. For example, if the media item is a video of a person making a speech, the default ALA value may correspond to an increase in the audio level. Similarly, if the media item is a video of a concert, the default ALA value may correspond to a decrease in the audio level. There may be rules stored in media data store 128 that cause ALA module 122 to set default ALA values if other instructions are not available. If the user associated with the requesting media player application 114 has an account with the media server 120, the ALA module 122 may adjust the default ALA value according to user information stored in account data store 130. For example, if a user sends audio commands to turn down a certain type of media item more often than other users, the ALA value may be changed accordingly.

The ALA module 122 determines 410 an audio level difference (ALD) value based on audio level index entries that correspond to a particular first and second media item pair. The ALD value is a numerical representation of the collective difference between the primary audio level and the secondary audio level for each of the audio level index entries for that particular media item pair. The ALD value may be determined, for example, by taking the mean, median, or mode of the difference values for each of the entries that correspond to the first and second media item. For example, returning to FIG. 3, if the first media item ID is 'Cat.mov' and the second media item ID is 'Pig.mov,' the ALD may be determined by taking the mean of the four difference values 326 that have 'Cat.mov' as the first media item ID and 'Pig.mov' as the second media item ID. The mean would be (33+23+0−4)÷4=+13. Thus, the ALD for the media item sequence may be +13. Depending upon the implementation, the ALD may be calculated in a variety of different ways beyond those mentioned above. For example, a median, a mode, a more complicated function may be used, outlier data may be thrown out to reduce variability in the result, etc.

In one implementation, the ALA module 122 uses a subset of the audio level index entries for a media item pair to determine the ALD value. For example, the ALA module 122 may only use entries in which the audio level was changed from the primary audio level to the secondary audio level during a certain time period. The time period may be, for example, the first 30 seconds of presentation of the second media item. This implementation rests on an assumption that if the sound strength for the second media item is not appropriate, a user is more likely to adjust the audio level closer to the beginning of presentation of the second media item. In contrast, adjustments later in presentation are less likely to be the result of an inappropriate sound strength. Thus, analyzing entries within a proscribed time period allows the ALA module 122 to determine ALA values that are more likely to lead to a more appropriate sound strength for the second media item.

In addition to being based on the default value derived from media item metadata and user information, the ALA value may be based on the determined ALD value. The ALA value may be equal to the ALD value. In another embodiment, ALA module 122 determines whether the determined ALD value exceeds a threshold for adjusting the ALA value. If the ALD value exceeds the threshold, the ALA module 122 adjusts 415 the ALA value to account for the audio level difference. The ALA value adjustment may be proportional to the ALD. If the ALD value does not exceed the threshold, no adjustment is made to the ALA value. Requiring that the ALD value exceeds a threshold may conserve computing resources in cases where the adjustment would be so minute as to be indiscernible by a user, or where data regarding user-initiated ALAs does not show a clear pattern of user-initiated adjustments.

The ALA module 122 adds 420 a new ALA index entry to an ALA index stored in media data store 128. In addition to default ALA index entries and user-specific ALA values, ALA index entries based on ALD values include data such as the media item IDs of the first and second media item pair, and the determined ALA value.

The ALA index entry corresponding to a particular pair of media items may have multiple possible ALA values. A particular media item pair may have different ALA values to be used with different audio output devices 118 or corresponding to different users. For example, the ALA module 122 may determine separate ALD values for audio level index entries corresponding to different audio output devices 118 and store different ALA values in the ALA index entry corresponding to the media item pair. This may result in a better user experience by accounting for sound strength variations among different users and different types of audio output devices 118.

Various steps in the process of determining an ALA value may be performed in a different order than the order illustrated in FIG. 4. The steps in the process may be performed at determined time intervals, responsive to a request from a media player application 114 for one of the media items in a pair, or at the behest of the server 120 or another logic process.

V. Audio Level Adjustment Application

Figure 5:
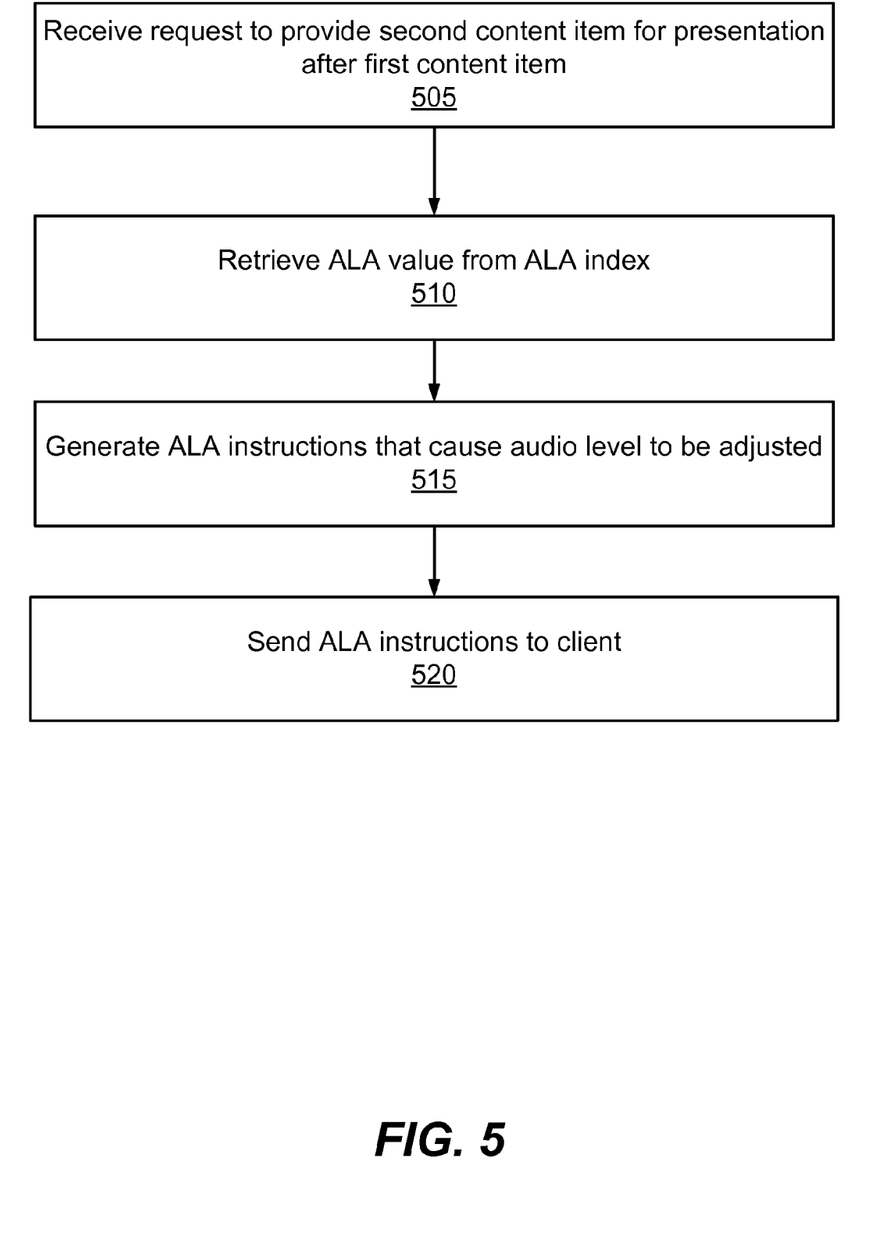
FIG. 5 is a flowchart of the steps for an example process for sending ALA instructions to a media player application that cause an automatic ALA adjustment when a second media item is presented for presentation after a first media item.

FIG. 5 is a flowchart of the steps for an example process for sending ALA instructions to a media player application that cause an automatic ALA adjustment when a second media item is presented for presentation after a first media item. The media server 120 receives 505 a request to provide a second media item for presentation after a first media item. The ALA module 122 retrieves 510 the ALA value associated with the first media item ID and the second media item ID from the ALA index.

The ALA module 122 generates 515 the ALA instructions to be sent to the requesting media player application 114. The ALA instructions include the ALA value for the requested first/second media item pair, and may further include instructions (e.g., computer software code) that cause the audio module 116 to automatically adjust the audio level based on the ALA value.

The media server 120 sends 520 the ALA instructions to the requesting client 110. The ALA instructions may be sent to the requesting client 110 along with the content of the second media item for presentation on the client 110, or they may be sent separately. When the media player application 114 of the requesting client 110 begins presentation of the second media item after the first media item, the audio module 116 automatically adjusts the audio level according to the ALA value. If, at any point, the audio module 116 receives an audio control command from the user to change the audio level, and the audio module 116 may register and store the audio control command according to the process of FIG. 2 for use in generating updated, future ALA instructions.

VI. Additional Considerations

Figure 6:
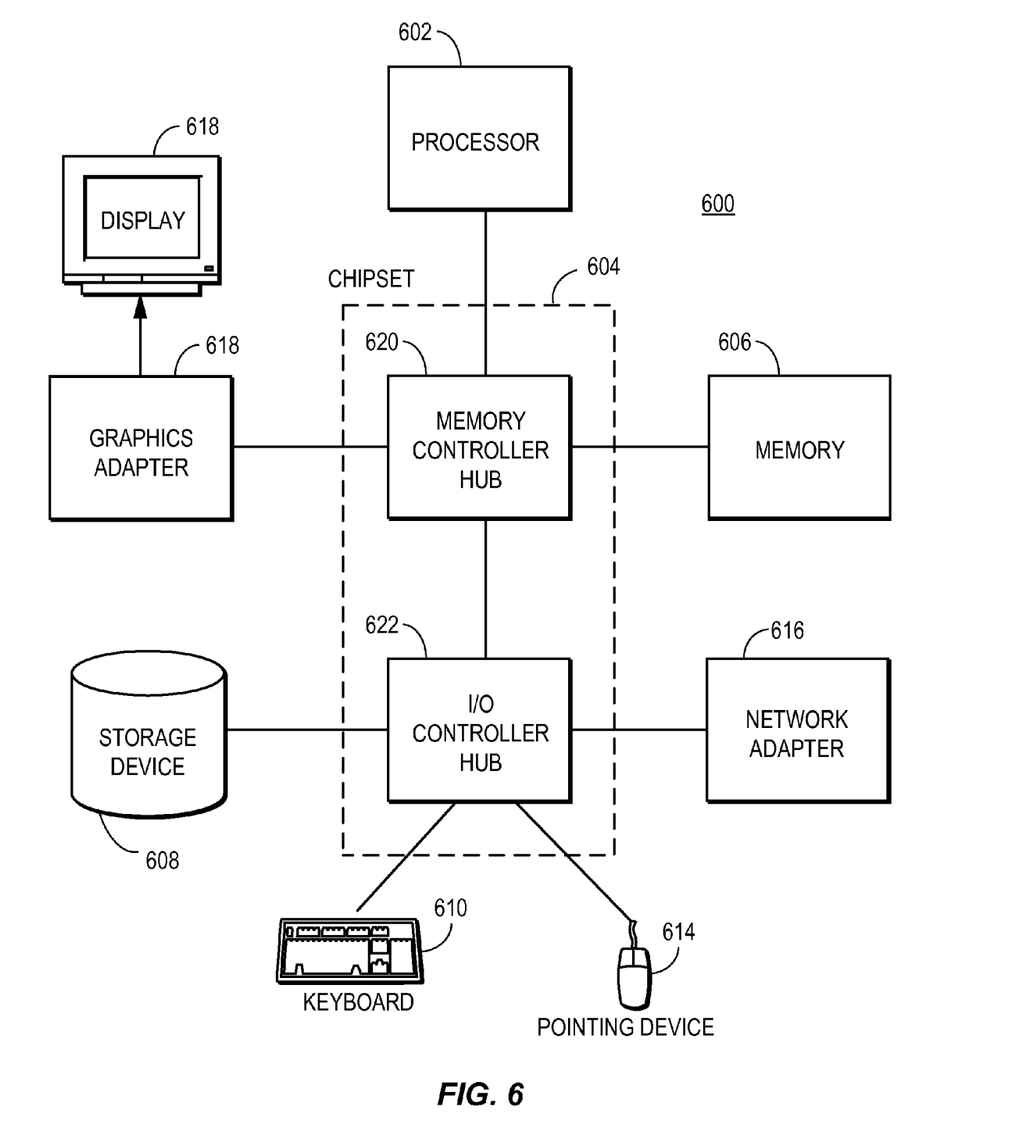
FIG. 6 is a high-level block diagram illustrating physical components of a computer used as part or all of one or more of the entities described herein in one embodiment.

FIG. 6 is a high-level block diagram illustrating physical components of a computer 600 used as part or all of one or more of the entities described herein in one embodiment. For example, instances of the illustrated computer 600 may be used as the client 110 or the media server 120. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604. In one embodiment, one or more audio output device is coupled to chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

It will be understood that the named components represent one embodiment, and other embodiments may include other components. In addition, other embodiments may lack the components described herein and/or distribute the described functionality among the components in a different manner. Additionally, the functionalities attributed to more than one component can be incorporated into a single component.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments described is intended to be illustrative, but not limiting, of the scope of what is protectable, which is set forth in the following claims.

What is claimed is:

1. A method comprising:
identifying a set of media items from a playlist that were presented in a plurality of media players of computing devices, each of the plurality of media players having a corresponding user, the set of media items including a first media item and a second media item presented sequentially to the corresponding user;
determining, for each of the plurality of media players, a first audio level value corresponding to an amplitude setting selected by a user of a respective media player during playback of the first media item and a second audio level value corresponding to an amplitude setting selected by the user of the respective media player during playback of the second media item;
determining an audio level difference (ALD) value for each of the plurality of media players based on a corresponding first audio level value and a corresponding second audio level value;
determining an aggregate ALD value based on ALD values determined for the plurality of media players; and
determining, based on the aggregate ALD value, a second audio level value for an amplitude setting to be provided for the second media item in response to a request of a new user to play the second media item in relation to the playlist.

2. The method of claim 1, further comprising:
comparing the ALD value to a threshold; and
responsive to the ALD value exceeding the threshold, adding, to an audio level adjustment (ALA) index, a new ALA index entry comprising a first media identifier associated with the first media item, a second media identifier associated with the second media item, and the ALD value.

3. The method of claim 1, wherein determining the aggregate ALD value comprises:
determining at least one of a mean, median, or mode of the ALD values determined for the plurality of media players.

4. The method of claim 1, further comprising:
determining, for each of the plurality of media players, a change time indicating a time during playback of the second media item that an audio level associated with the respective media player was set to the second audio level value.

5. The method of claim 4, wherein the aggregate ALD value is determined using a portion of the plurality of media players having the change time within a defined range.

6. The method of claim 5, wherein the defined range is 30 seconds after a start time of the second media item.

7. The method of claim 1, further comprising:
determining, for each of the computing devices, an audio output device identifier (ID) identifying an audio output device operatively coupled to a respective computing device during playback of the set of media items from the playlist.

8. The method of claim 7, further comprising:
determining an output device-specific ALD value based on ALD values determined for a portion of the computing devices having the audio output device ID.

9. A non-transitory computer readable storage medium storing instructions for facilitating content item access, the instructions when executed by a processor configured to cause the processor to:
identify a set of media items from a playlist that were presented in a plurality of media players of computing devices, each of the plurality of media players having a corresponding user, the set of media items including a first media item and a second media item presented sequentially to the corresponding user;
determine, for each of the plurality of media players,
a first audio level value corresponding to an amplitude setting selected by a user of a respective media player during playback of the first media item and
a second audio level value corresponding to an amplitude setting selected by the user of the respective media player during playback of the second media item;
determine an audio level difference (ALD) value for each of the plurality of media players based on a corresponding first audio level value and a corresponding second audio level value;
determine an aggregate ALD value based on ALD values determined for the plurality of media players; and
determine, based on the aggregate ALD value, a second audio level value for an amplitude setting to be provided for the second media item in response to a request of a new user to play the second media item in relation to the playlist.

10. The non-transitory computer readable storage medium of claim 9, the instructions further configured to cause the processor to:
compare the ALD value to a threshold; and
responsive to the ALD value exceeding the threshold, add, to an audio level adjustment (ALA) index, a new ALA index entry comprising a first media identifier associated with the first media item, a second media identifier associated with the second media item, and the ALD value.

11. The non-transitory computer readable storage medium of claim 9, wherein to determine the aggregate ALD value, the processor is further to:
determine at least one of a mean, median, or mode of the ALD values determined for the plurality of media players.

12. The non-transitory computer readable storage medium of claim 9, the processor further to:
determine, for each of the plurality of media players, a change time indicating a time during playback of the second media item that an audio level associated with the respective media player was set to the second audio level value.

13. A system, comprising:
a memory;
a processor coupled to the memory, the processor to:
identify a set of media items from a playlist that were presented in a plurality of media players of computing devices, each of the plurality of media players having a corresponding user, the set of media items including a first media item and a second media item presented sequentially to the corresponding user;
determine, for each of the plurality of media players,
a first audio level value corresponding to an amplitude setting selected by a user of a respective media player during playback of the first media item and a second audio level value corresponding to an amplitude setting selected by the user of the respective media player during playback of the second media item;

determine an audio level difference (ALD) value for each of the plurality of media players based on a corresponding first audio level value and a corresponding second audio level value;

determine an aggregate ALD value based on ALD values determined for the plurality of media players; and determine, based on the aggregate ALD value, a second audio level value for an amplitude setting to be provided for the second media item in response to a request of a new user to play the second media item in relation to the playlist.

14. The system of claim 13, the processor further to:

determine, for each of the computing devices, an audio output device identifier (ID) identifying an audio output device operatively coupled to a respective computing device during playback of the set of media items from the playlist.

* * * * *